June 25, 1929.  E. H. GUILFORD  1,718,352
METHOD OF LOCATING UNDERGROUND CONDUCTIVE BODIES
Filed Aug. 11, 1926   4 Sheets-Sheet 1
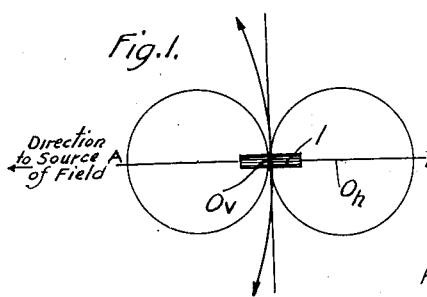
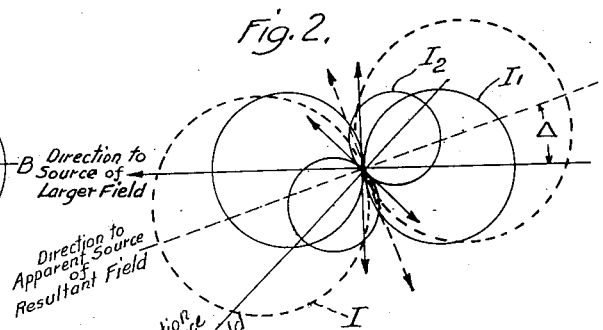
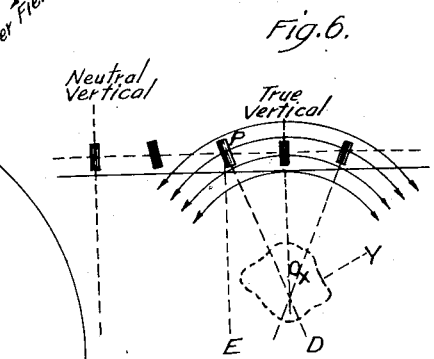
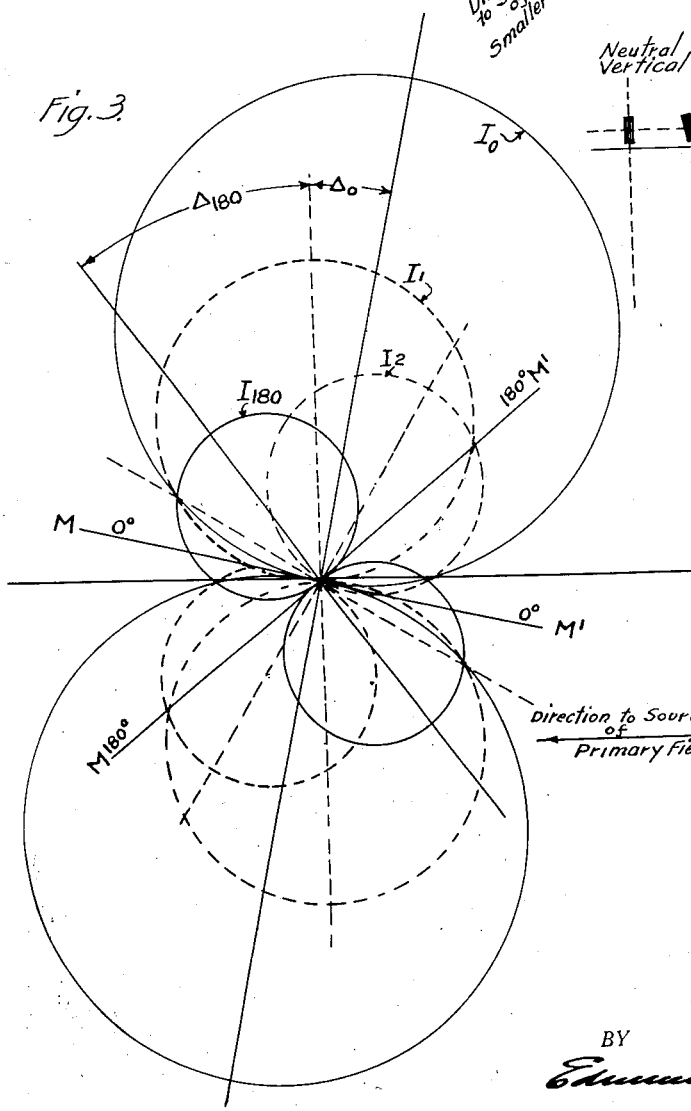
INVENTOR.
Edward H. Guilford,
BY
ATTORNEY

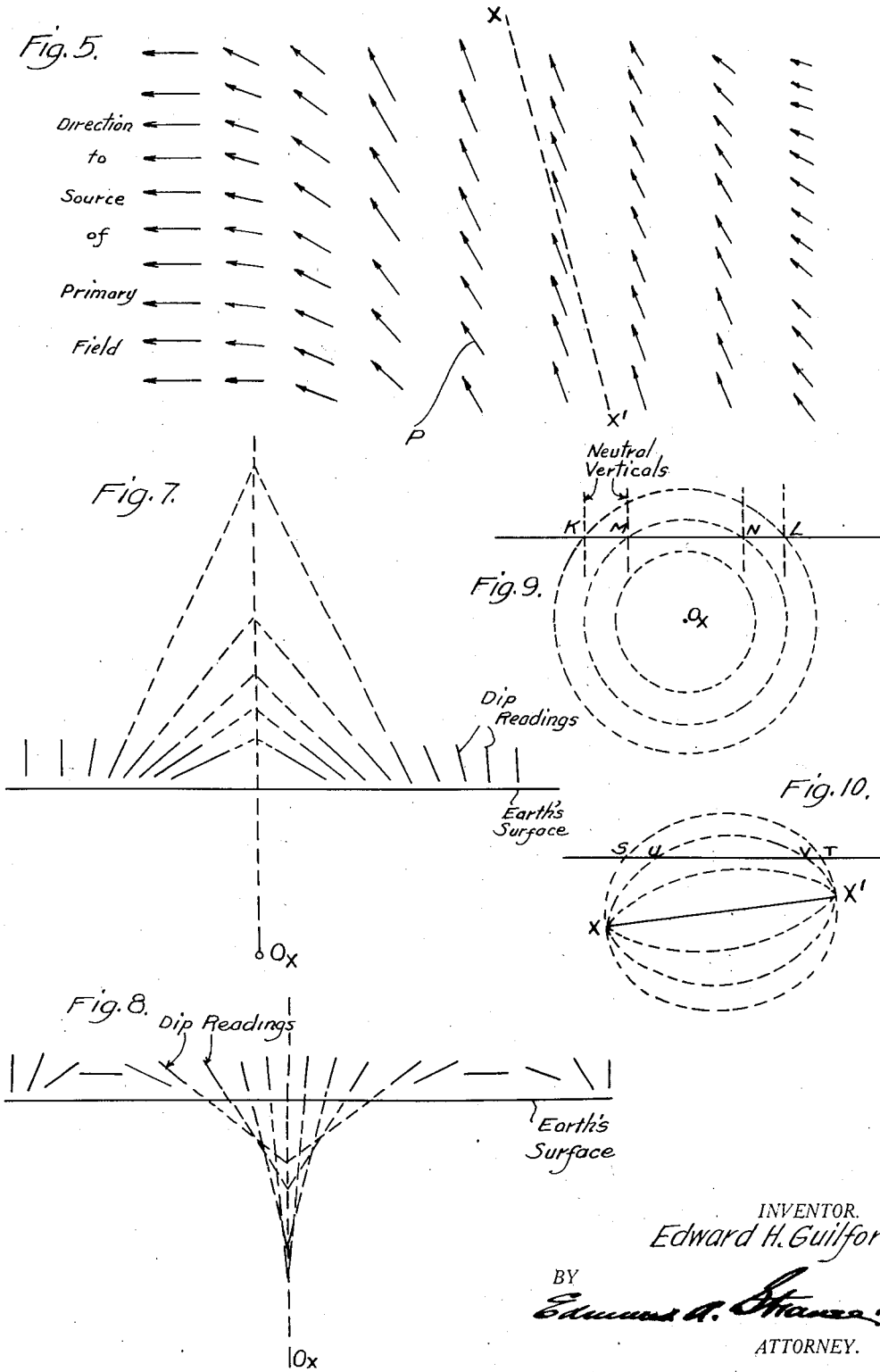

June 25, 1929.  E. H. GUILFORD  1,718,352
METHOD OF LOCATING UNDERGROUND CONDUCTIVE BODIES
Filed Aug. 11, 1926  4 Sheets-Sheet 3
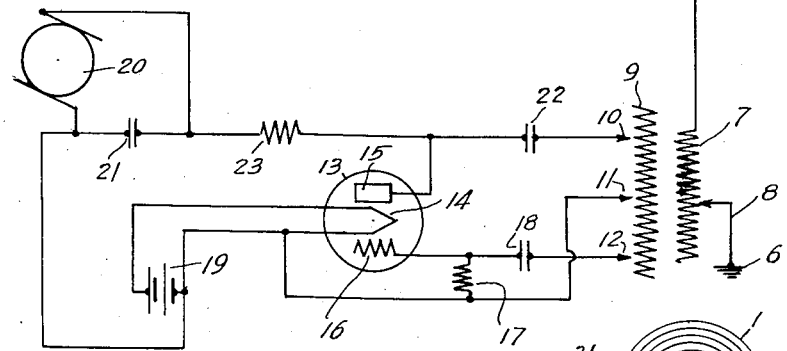
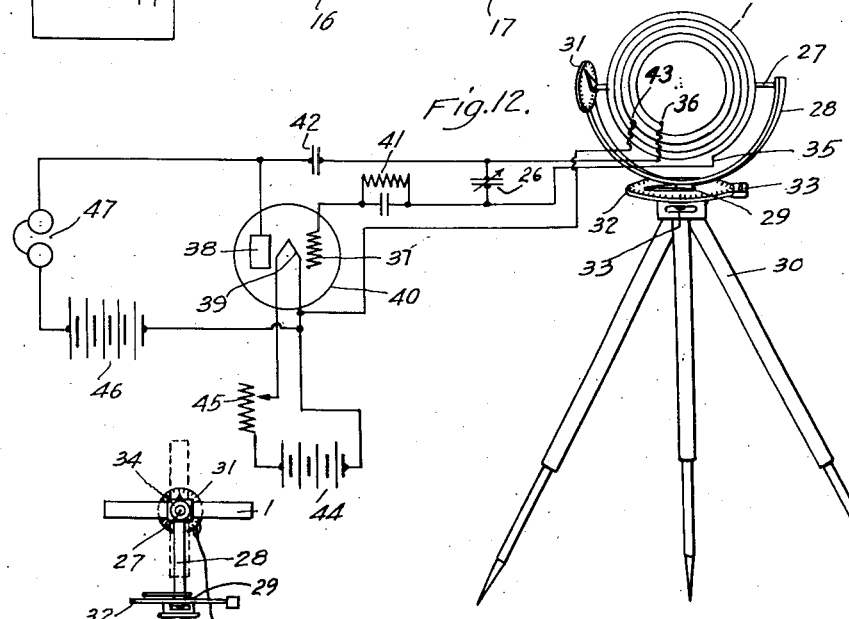
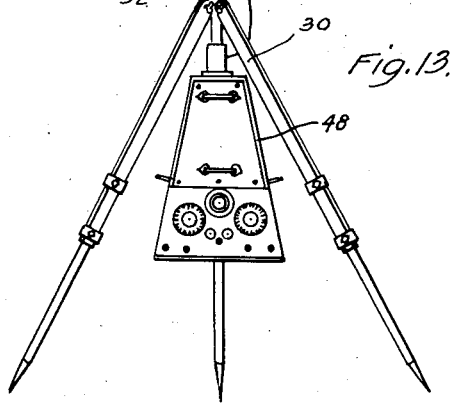
INVENTOR.
Edward H. Guilford,
BY
ATTORNEY.

June 25, 1929.   E. H. GUILFORD   1,718,352
METHOD OF LOCATING UNDERGROUND CONDUCTIVE BODIES
Filed Aug. 11, 1926   4 Sheets-Sheet 4
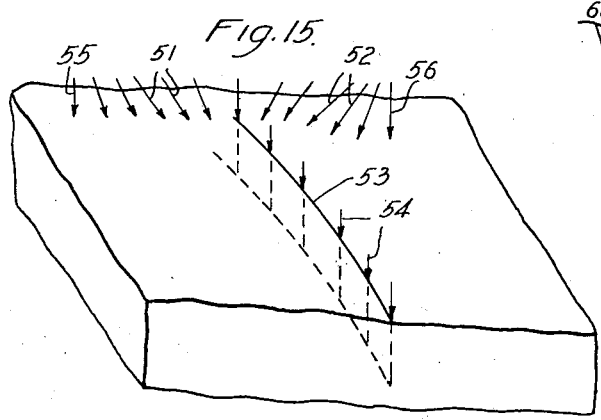
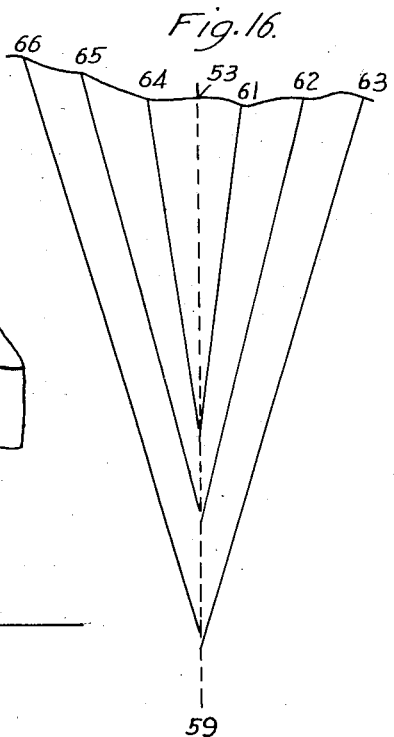
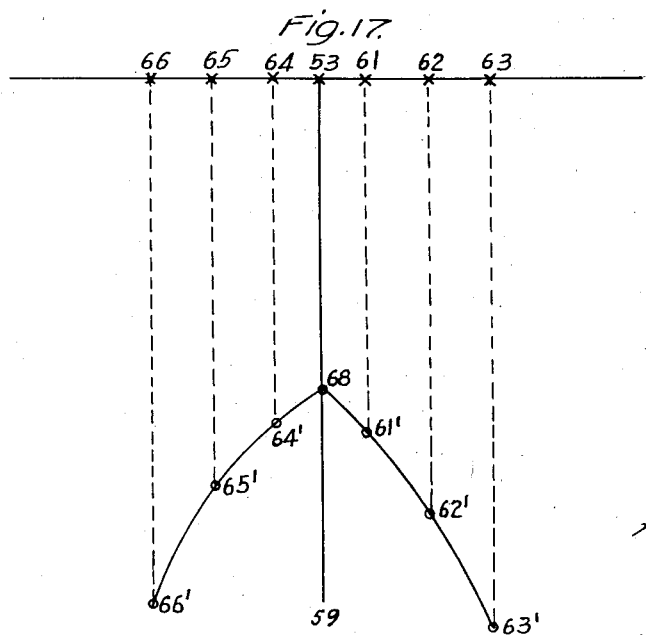
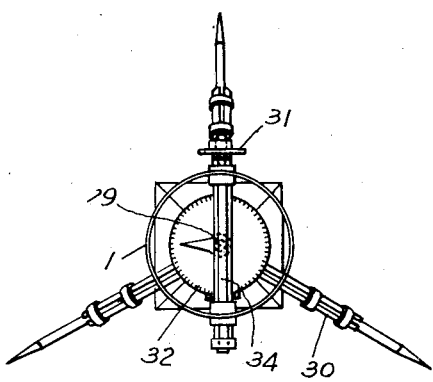
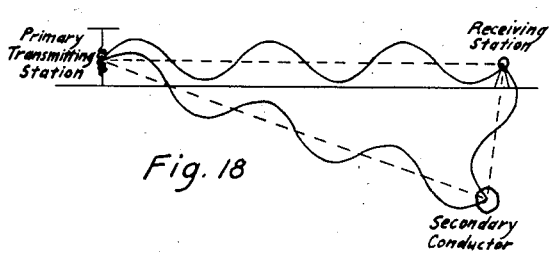
INVENTOR.
Edward H. Guilford
BY
ATTORNEY.

Patented June 25, 1929.

1,718,352

UNITED STATES PATENT OFFICE.

EDWARD H. GUILFORD, OF DARWIN, CALIFORNIA, ASSIGNOR TO THE RADIORE COMPANY, OF LOS ANGELES, CALIFORNIA, A CORPORATION OF CALIFORNIA.

METHOD OF LOCATING UNDERGROUND CONDUCTIVE BODIES.

Application filed August 11, 1926. Serial No. 128,601.

This invention relates to the art of locating unknown conducting minerals or other conducting bodies by electrical methods involving re-radiation principles; in which a high frequency electromagnetic field (called the primary field) is applied to the area in which unknown conductive ore bodies or other unknown conductors supposedly exist, for the purpose of inducing a current to flow in any such conductor, which will of course be accompanied by a secondary electro-magnetic field surrounding such conductor. By means of suitable apparatus including a receiving coil and means for measuring the intensity of current induced therein, and means for indicating the direction and inclination thereof, the axis of the secondary field is located, and the location of the unknown ore body is thus determined, since the axis of this field is the axis of conductivity of the ore body, which may in general be considered as being contained within such conductor. More particularly, this invention relates to the recognition of resonance and phase relationship phenomena in applying the primary field and in measuring or locating the secondary field and to the valuable effects which may be obtained by applying the laws of such phenomena to the method referred to above.

The principal object of this invention is to provide a method which, by the intelligent recognition and utilization of resonance and phase relationship phenomena, permits more accurate indications to be obtained as to the location of the unknown conductor than by methods heretofore used, and which in particular makes it possible to locate conductors at greater depths than heretofore, and to determine more accurately the length, depth, and approximate size or thickness thereof, and also minimizes the disturbing effects of other nearby conductors, as well as of the primary field itself, upon the secondary field surrounding the particular conductor whose location is being determined. The invention is based essentially upon the application of resonance and phase relationship phenomena for the purpose of enabling one to:

A. Locate bodies at greater depths than would be possible if arbitrary frequencies of primary field were employed;

B. Determine more accurately the length of the unknown body;

C. Determine more accurately the depth of the unknown body;

D. Determine more accurately the horizontal profile of the unknown body;

E. Minimize the effect of other secondary fields, from adjacent known or unknown conductors, upon signals which are being obtained to locate the secondary field;

F. Minimize the relative effects of the primary field upon the coil or other apparatus which is being employed to locate the axis of a secondary field.

A further object of the invention is to utilize a primary field of a certain optimum frequency, that is, of such frequency that the most accurate indications of the location of the unknown conductor are obtained. An important feature of my invention consists in the determination of such optimum frequency.

A particular object of the invention, in the case of unknown conductors having a resonant frequency of oscillation, is to utilize a primary field whose frequency is equal to the resonant frequency of the unknown conductor, in order to obtain the above advantages.

A further object of the invention is to provide for an in-phase relationship between the primary and secondary fields so as to realize certain advantages as hereinafter described.

I have found by actual tests that electromagnetic waves commonly known as radiation fields and including both electric and magnetic lines of force, and that induction fields, when coming into the vicinity of electric conductors such as electrically conductive ores, pipe lines, tracks, wires, and other metallic conductors, tend to induce, or set up alternating electric currents, or that the electric or magnetic, or both, components of the electromagnetic waves, and of the induction fields, are absorbed by the electrically conductive bodies, to reappear in the form of an alternating electric current confined to the electrically conductive body. This induced electric current is of course accompanied by an electromagnetic field surrounding the path of the current, which I call for convenience sake, a secondary electromagnetic field.

In the broad aspect of the invention I produce a primary alternating electromagnetic field of high frequency and great intensity and comprising electric and magnetic lines of force in the vicinity of the area of be explored, and by means of the searching apparatus hereinafter described in detail, I note the secondary fields, if any, in this electromagnetic field, such secondary fields indicating clearly the location of the electrically conductive body.

In the broad aspect of my invention, in applying a primary electromagnetic field to the unknown conductive ore body or other unknown conductor, I employ a generator of primary electromagnetic fields of such design or arrangement that the frequency of the primary field may be adjusted to any given value between wide limits, and then by a proper recognition and interpretation of the indications which I obtain with a coil or other apparatus for determining the strength and direction of electromagnetic fields and for locating the axes of secondary fields, I determine the frequencies at which any such secondary fields as may exist in the area which is under survey cause the resultant field to have the maximum distortion from the direction of the primary field toward the direction of the secondary field, so that by a suitable adjustment of the frequency of the primary field I obtain the maximum accuracy of indications which will enable me to obtain the desired results. The frequency so determined may be called the "optimum frequency", since I am enabled by the use of a primary field of such frequency to obtain the best or most accurate results. The variation in intensity of effect of the secondary field corresponding to variation in frequency of the primary field may be chiefly or partially due, in the case of secondary conductors having a natural frequency of oscillation or resonant frequency, to the relation between the frequency of the primary field and the resonant frequency of the secondary conductor, and in such cases the frequency at which the maximum distorting effect is produced may be considered as approximating the resonant frequency of the unknown conductor.

In general, however, I believe that the variation in distorting effect of the secondary field upon variation in frequency of the primary field, is due principally to the variation in the phase relationship between the currents induced in the receiving coil by the primary and secondary fields, as hereinafter described, and in so far as this phase relationship is the controlling factor (and I believe it to be such in most cases), the frequency at which the maximum distorting effect of the resultant field toward the direction of the secondary field is obtained, is that frequency at which the two currents are in substantially 0° phase relation so as to be directly added to one another. Therefore, according to this aspect of my invention, my method of procedure consists in varying the frequency of the primary field until, by the means of interpretation hereinafter outlined, a frequency is found at which the currents induced in the coil by the primary and secondary fields are substantially in 0° phase relationship with one another, and then utilizing a primary field of this frequency in making the final measurements leading to the location of the unknown conductor.

Re-radiation may be described as the occurrence of a secondary high frequency alternating electromagnetic field about a conductor which is located within a primary high frequency alternating electromagnetic field. These high frequency electromagnetic fields comprise both radiation and induction fields, either one of which may represent the greater part of the total field at any particular point, depending upon the relation between the frequency of the field and the distance of such point from the source of the field. The expression "electromagnetic field" will therefore be used herein as including both the radiation and induction field, and the term "re-radiation" will be used as including the production of a total secondary field, of which either the "radiation" component or the "induction" component may predominate at the point or points at which measurements are made in the secondary field. Furthermore the electromagnetic lines of force of any high frequency field will, for the sake of clarity, be spoken of hereinafter as "magnetic" lines of force, and the electrostatic lines of force will be spoken of as "electric" lines of force. For a verification of the above definitions and relationships, reference may be had to Bureau of Standards Scientific Paper No. 354, Part III, pages 452 to 456, by Dr. J. H. Dellinger, and to "Principles of Radio Communication" pages 181 to 183, and 694 to 705, by J. H. Morecroft, published 1921, by John Wiley and Sons.

The primary field used for inducing current in the unknown conductive body may be set up by means of an ordinary vertical antenna system. In such a field, at points near the surface of the earth and somewhat removed from the antenna, the electric lines of force extend substantially vertically, and the magnetic lines of force extend in a circular direction about the antenna and in a substantially horizontal plane. An electromagnetic field of this type is known in the art of radio transmission as a "vertically polarized" field, since its electrical axis is vertical. It should be borne in mind that in such a field, even though it is spoken of as "vertically polarized", the magnetic lines of force extend horizontally at points substantially in the horizontal plane of the antenna system. For a discussion of the meaning of the term "vertical polarization", reference may be had to an article entitled "Polarized transmission", by Robert S. Kruse, on page 9 of Q. S. T., 1926, published by the American Radio Relay League.

I have found in practice that, when the secondary conductor is surrounded by a primary field of great intensity, or when a primary field of even relatively low intensity is adjusted to a certain optimum frequency, the area within which the resulting secondary field may be detected covers hitherto unexpected distances, and thus this phenomenon may be utilized in locating unknown conductors such as electrically conductive ore bodies, pipe lines and the like, and I have also found that a proper recognition of the principles involved enables me to obtain the best results commensurate with the conditions at hand. While this invention relates particularly to the application of resonance and phase relationship phenomena to methods of locating unknown conductors by re-radiation methods I will first outline in a general way the factors which vitally effect re-radiation, and which affect the use of a coil simultaneously acted upon by two or more fields of identical frequency, and which control the determination of the location of the axis of a secondary field, in order that a clear understanding may be had of the application of this invention.

The accompanying drawings illustrate the principles involved in the application of my invention, and certain apparatus used in carrying out the same, and referring thereto:

Fig. 1 illustrates diagrammatically the use of a coil receiver as a direction finder.

Fig. 2 is a diagrammatic representation of the resultant direction of two electromagnetic fields, as obtained with the use of a coil direction finder.

Fig. 3 is a diagrammatic representation showing the effect of phase relationship upon the resultant field.

Fig. 4 illustrates the effect of an unknown secondary conductor upon a coil receiver.

Fig. 5 illustrates the "strike" readings obtained in the region of an unknown conductor according to my invention.

Fig. 6 is a diagrammatic vertical section illustrating the method of obtaining "dip" readings according to my invention.

Figs. 7 and 8 are diagrammatical vertical sections illustrating the "dip" readings obtained with the component coil currents, due to the primary and secondary fields, out of phase.

Figs. 9 and 10 are diagrammatic vertical sections illustrating the effect of resonance upon the strength of the secondary field.

Fig. 11 is an electrical diagram of a transmitting apparatus which may be used in connection with my invention.

Fig. 12 is a diagrammatic perspective view of a receiving coil means which may be used in connection with my invention, the electrical circuits connected thereto being also shown diagrammatically.

Fig. 13 is an elevation of the receiving coil means, together with the supporting means therefor.

Fig. 14 is a plan view of the same.

Fig. 15 is a perspective view illustrating the method of determining the plan view location of an underground conductor.

Fig. 16 represents the method of plotting "dip" readings.

Fig. 17 shows a method of plotting to determine the depth of the axis of the conductor.

Fig. 18 is a diagrammatic representation of the effect of relative distance of receiving coil from sources of primary field and secondary field, and between said sources, upon the phase relationship between the primary and secondary fields at the position of the receiving coil.

For the purpose of clearly outlining the laws governing the action of a coil used for direction finding purposes, reference is first made to Fig. 1 which shows the characteristic curve of the intensity of current induced in a coil 1 by a single vertically polarized field, as the coil is rotated through 360° about a vertical axis, in a position substantially in the horizontal plane of the source of the field. In this figure the coil is shown in plan view and the vertical axis thereof is indicated at $O_v$. The direction of the magnetic lines of force is indicated by the curved arrow. It is well known to those versed in the art that for the condition of maximum current induction, and hence of maximum signal intensity, the plane of the coil extends in the position shown, namely, in a direction toward the axis of the electromagnetic field, while for any other position of the coil the current induction follows the figure-of-eight curve shown. This is due of course to a variation in the total flux through the coil, the position of maximum signal intensity being that at which such flux is a maximum. If, on the other hand, the coil be turned to the position shown and then rotated about its horizontal axis $O_h$, it will be found that as the position of the coil deviates from the vertical the current intensity also decreases and follows a similar figure-of-eight. The coil therefore indicates by its vertical position that the field is vertically polarized, that is that the axis of such field is vertical. As stated above, the magnetic lines of force of such field at the position of the coil extend substantially horizontally, or perpendicular to the plane of the coil at the time of maximum signal intensity. If the field was polarized about a non-vertical axis, then rotation of the coil about a horizontal axis pointing toward the source of the field would give a maximum current induction when the axis $O_v$ of the coil extended in a direction parallel to the axis of the field and would thus indicate the direction of polarization thereof. It will be seen therefore that a coil receiver may be used to indicate both the direction toward the axis of the field and also the direction of polarization thereof.

It may be noted here that, in actual practice, it is customary, instead of directly determining the position of the coil for maximum current induction, to note the direction indicated by the two positions of minimum current induction (minimum signal intensity), and then take as a direction of maximum a direction half-way between the two minimums. This is for the reason that the minimums are generally much sharper than the maximums, and more accurate results are thus obtained. Without the presence of the so-called "antenna effect" the minimums will occur 180° apart and hence the indicated direction toward the axis of the field will be 90° to either minimum. The antenna effect often tends to make the minimums broad instead of sharp and also tends to cause the minimums to occur other than 180° apart (less than 180° in one direction and greater in the other). In determining the direction of electromagnetic fields for the purpose of this invention, it is highly essential that such "antenna effect" be recognized and compensated for, or eliminated or reduced as far as possible, and for this purpose care must be exercised in the design of the coil and its auxiliary apparatus. This antenna effect together with its influence in broadening or displacing the minimum readings obtained by a coil, and methods of eliminating it, are outlined in Bureau of Standards Scientific Paper No. 428, pages 541 to 544. While that paper deals particularly with the antenna effect when a single field is imposed upon the coil, it has been found that the methods of elimination of antenna effect therein outlined also give satisfactory results when two or more fields are imposed on the coil, as by the method of the present invention, and these or other methods of prevention should therefore be followed in all cases in order to secure the most accurate results.

In Fig. 2 is represented the curve of current induced in a coil by the resultant field made up of two component fields, which are identically polarized but whose axes are at different directions from the coil. In this figure, $I_1$ represents the current curve which would be produced by the larger field, and $I_2$ that which would be produced by the smaller field. The current curve of the resultant field, for a condition when the fields are of identical frequency and when the currents induced in the coil are in 0° phase is shown at I, and indicates as shown, the direction toward the apparent source of the resultant field. The angle of apparent distortion in the direction of the larger field, due to the effect of the smaller field, is indicated at $\triangle$. A difference in polarization of the two component fields would have a similar effect upon the current curve. It may therefore be seen that if a plurality of readings be taken with a coil in a region in which such coil is subject to the resultant of two electromagnetic fields of different directions and polarizations, then if the direction toward and the polarization of one of the fields are known, the location of the axis of the other field may be calculated.

It is also evident from Fig. 2 that the apparent direction of the resultant field is dependent not only upon the directions of the two fields but also upon the relative intensities and phase relationship thereof. In said figure, for example, the direction of the resultant field is nearer to that of the larger field whose current curve is shown at $I_1$, than to that of the smaller field. In order, therefore, to obtain the most accurate indications of the direction of the secondary field surrounding an unknown conductor, it is of advantage to have the strength of such secondary field as great as possible as compared with the primary field used to induce the flow of current in such conductor. This result is obtained in certain instances according to my invention by employing a primary field whose frequency is substantially the resonant frequency of such conductor, as hereinafter described.

The effect of phase relationship upon the apparent direction of the resultant field is illustrated in Fig. 3, in which $I_1$ and $I_2$ represent the current curves for the primary and secondary fields respectively. $I_0$ is the resultant current curve when the currents produced by the two fields are in phase, that is with 0° phase difference, while $I_{180}$ is the corresponding curve when the two currents are 180° out of phase. The directions of the coil for minimum signal strength are indicated by the two lines M—M', one for 0° phase difference and one for 180° phase difference, while $\triangle_0$ and $\triangle_{180}$ represent the apparent distortion in direction of the primary field for the two cases. It will be seen that when the two currents are in 0° phase relation, the resultant field is distorted from the direction of the primary field toward that of the secondary field, while in the case of the 180° out-of-phase relation the distortion is in a direction away from the secondary field. It is also evident that the resultant current is much greater when the two currents are in phase than when they are 180° out of phase. Any departure from an in-phase relationship therefore decreases the strength of the resultant current and gives weaker signals. It also decreases the sharpness of the minimum points and hence makes the readings less accurate. It is therefore extremely advantageous to maintain a substantially in-phase relationship between the currents induced in the receiving coil by the primary and secondary fields, which can be approximately detected by the sharpest minimum and the maximum signal intensity. The exact determination of the frequency at which the primary and secondary fields are in 0° phase relationship is based upon the above mentioned fact that at this frequency the maximum distortion of the apparent direction of the resultant field from that of the primary field toward that of the secondary field is obtained, and this determination may be carried out as described hereinafter.

The establishment of an in-phase condition depends upon the relationship between the distances of the sources of the two fields from one another and from the detecting or direction-finding apparatus, upon the direction of the secondary conductor with respect to the polarization of the primary field, and upon the frequency of the field. The meaning of an "in-phase relationship" or a "0° phase relationship" is illustrated diagramatically in Fig. 18, in which the relative position of the primary transmitting station, the secondary conductor, and the receiving station are indicated. It will be seen from the curves representing the alternations of the fields, that with the particular frequency illustrated, the primary and secondary fields are exactly in phase with one another at the position of the re-receiving coil, and if these fields cut the conductors of the receiving coil in the same direction the two currents will also be exactly in-phase with one another. While for the purpose of illustration I have shown the distance between transmitting station, unknown conductor, and receiving station as being one or more wave-lengths, it will be understood that with the frequencies actually employed such distances will in general only be fractional parts of the wave length. The same principles of phase relationships will, however, apply.

In practicing my invention I prefer to set up a vertically polarized primary electromagnetic field in the region to be explored. A current is induced by this field in any conducting bodies, such as ore bodies, which may exist beneath and sufficiently close to the surface of the earth in this region, and such induced current will in turn set up secondary electromagnetic fields whose axes correspond substantially to the axes of inertia of such bodies. The direction of the lines of force of any such secondary field will, at any point in the region, be different from that of the lines of force of the primary field. Such a condition is illustrated diagrammatically in Fig. 4 which may be considered, for example, as a plan view. The direction of the electromagnetic lines of force of the primary field is indicated by the curved arrow. The axis of an underground ore body is shown at X—X¹, and the direction, at the position of the coil, of the electromagnetic lines of force of the secondary field set up about said body is indicated by the straight arrow. Under these conditions the coil at the position of maximum signal intensity will not extend in the direction toward the axis of the primary field as in Fig. 1, but will be deflected through a certain angle, dependent upon the relative strengths of the primary and secondary fields, and upon their time-phase relationship, for example to the position indicated. Such a behavior of the coil indicates the presence of an underground conducting body. The horizontal angle between the direction of the horizontal axis of the coil (taken more or less toward the axis of the primary field) and a known direction, such as north, may for the sake of convenience be called the "strike" angle, and the "strike" readings obtained as above described furnish important indications as to the location of an underground conductor.

A typical set of "strike" readings which might be obtained above a very large conducting body having an axis X—X' are shown in Fig. 5. Such readings are approximately parallel to the conducting body at points directly over the same and for short distances on both sides. Beyond a certain distance either side of the conductor the "strikes" point substantially in the direction of the source of the primary field, while at intermediate points the "strikes" gradually vary between these two extremes.

Such a configuration of "strikes", in which the "strike" readings are distorted from the normal position when influenced solely by the primary field, indicates clearly the presence of a secondary field, and the zone of maximum distortion of such "strikes" indicates approximately the "plan view" or the horizontal profile of the axis of such secondary field and hence of the underground conductor.

The coil receiver may also be used to obtain indications as to the depth of unknown conductive bodies as well as their plan view location. This is due to the fact that, in the neighborhood of such bodies, the coil gives a maximum signal intensity in a position other than vertical, by reason of the effect of the secondary field thereon. If in Fig. 5 at any position of the coil such as indicated by the arrow P, the coil be turned about a vertical axis until in the direction of such arrow, that is, the direction of maximum signal intensity, and if such coil be then rotated about its horizontal axis while such horizontal axis is maintained in the direction of such arrow, it will be found that at a certain inclination of the coil the signal intensity will be greater than in the vertical position.

This condition is illustrated in Fig. 6 which is a diagrammatic transverse vertical section of an underground ore body Y having its axis at $O_x$. The coil at point P will then give a maximum indication at some inclination such as that shown, providing that the two components of the resultant coil current, the one due to the primary field and the other due to the secondary field, are substantially of an in-phase relationship, due to the effect of the secondary field about said ore body, whose electromagnetic lines of force extend substantially in the direction indicated by the arrows. The angle of inclination of the coil (with respect to the vertical) for maximum signal reception, that is, the angle EPD (Fig. 6) may be termed the "dip" angle, and the variations in "dip" readings provide important indications as to the location, and particularly as to the depth of unknown conductive bodies, as will be hereinafter explained in greater detail.

At a point directly above the conductor the coil will be vertical (0° dip) and the positions of zero "dip" between converging "dips" give a further indication as to the plan view location of the conductor. As the coil is moved outwardly from this position, in either direction, the "dip" readings gradually increase to a maximum and then decrease again to zero as the coil passes out of the region in which it is noticeably affected by the secondary field. The point at which the coil first indicates a zero dip, when moved away from a conductor and through a region of inclined dips, may be called a "neutral vertical" point, and the shifting of such neutral vertical points with varying frequency of primary field is utilized according to my invention to determine the optimum frequency of the primary field for use in locating each conducting body, that is the frequency which causes the maximum distorting effect from the direction of the primary field toward that of the secondary field.

If the two component currents of the resultant coil current, the one being due to the primary field, the other being due to the secondary field, are substantially of an out-of-phase relationship it can be shown that in general the "dips" will not converge about the axis of the secondary conductor, but will converge or intersect above the surface of the earth as shown in Fig. 7, until the ratio of the current due to the secondary field and the current due to the primary field, expressed arbitrarily as $\frac{I'}{I}$, is greater than $\frac{1}{I}$. It can also be shown with the component coil currents in an out-of-phase relationship and a greater ratio than $\frac{1}{I}$, the resultant "dips" obtained at substantially equal distances either side of the vertical dip will converge at points above the axis, as is illustrated in Fig. 8. In practice an out-of-phase condition is to be avoided as it results in broad minimums due to weak resultant coil currents and also for the reason that unless the ratio $\frac{I'}{I}$ is greater than $\frac{1}{I}$ converging "dips" upon the unknown axes will not be obtained. I therefore prefer to maintain an in-phase relationship, by adjusting the frequency of the primary field in relation to the distances between the point of measurement and the sources of the primary and secondary fields until a frequency is found at which dips converge below the conductor, as hereinafter described, and at which the maximum distorting effect is obtained, as indicated for example by a maximum distance of the "neutral vertical" from the vertical above the conductor. The maintenance of this relation between the two fields not only gives the most accurate readings, but also ensures that the "dips" will be properly interpreted as converging somewhat below the axis of the unknown conductor, as hereinafter described.

The effect upon the secondary field, from a standpoint of resonance, of varying the frequency of the primary field is illustrated in Figs. 9 and 10. The shape and intensity of the secondary field, and consequently the area over which it may be detected by any particular coil receiver or other detecting means, depends upon the distribution of the induced current in the unknown conductor, which in turn depends upon the size, shape, and homogeneous conductive character of the conductor, upon the relative conductivity of the surrounding matter, and, in the case of an unknown conductor having a natural frequency of oscillation, upon the frequency of the primary electromagnetic field. For a given conductive body and a given strength of primary field, the strength of the secondary field will in such case depend in part at least upon the relation between the frequency of the primary field and the resonant frequency of the unknown conductor.

For example, referring to Fig. 9, suppose an unknown conductor to have its axis at $O_x$. If the frequency of the primary field is exactly equal to the resonant frequency of such conductor, the current induced in the conductor will be a maximum, and consequently the strength of the secondary field will have a maximum value. If a line be drawn through all points in a given plane perpendicular to the axis $O_x$ at which the secondary field is of equal intensity, such line will approximate a circle, cutting the earth's surface for example at K and L. If this intensity is the least which may be detected with the means at hand, then it will be seen that with the primary field in resonance with the unknown conductor the secondary field can be detected on the earth's surface at any point between K and L (disregarding for the moment the effect of phase relationship). K and L are therefore points of "neutral vertical" for resonant frequency.

For any frequency of primary field other than resonant frequency, a less intensity of secondary field will result. For a non-resonant frequency, then, the circle of minimum detectable secondary field will cut the earth's surface at points closer together, such as at M and N, so that the area on the earth's surface within which such field can be detected is thus considerably narrower than before. The "neutral vertical" points at this frequency are therefore at M and N. If the frequency departs still further from resonant frequency the innermost circle may be caused to prevail, under which conditions no indication at all of the secondary field about $O_x$ would be obtained at the earth's surface.

The use of a primary field of resonant frequency with respect to the unknown conductor not only enables the secondary field to be detached at greater distances to either side of the conductor, but also throughout greater distances lengthwise of the conductor. This fact is illustrated in Fig. 10, in which the curve of elliptical shape cutting the earth's surface at S—T represents the positions at which the secondary field about the conductor X—X¹ is barely detectable by the means at hand, when the primary field is in resonance with such conductor. For a different frequency such curve will cut the earth's surface at points closer together, such as U—V, or it may not reach the earth's surface at all, as indicated by the innermost curve. It is evident, therefore, that the more nearly the primary field approaches resonance with the unknown conductor, the more nearly will the distance, on the earth's surface and longitudinally of the conductor, throughout which indications of the secondary field may be obtained, approach the actual length of the conductor. The use of a primary field whose frequency is substantially equal to the natural frequency of oscillation of the unknown conductor therefore permits more accurate indications to be obtained as to the length of such conductor.

An important feature of my invention therefore consists in some cases in causing the primary field to have a frequency equal to the natural frequency of oscillation of the underground conductor whose position is to be determined, and in the methods of determining this frequency and of interpreting the results which are obtained.

I will now describe certain apparatus which may be used in carrying out my improved method. Any suitable or well-known form of transmitting apparatus may be used for the purpose of creating the primary electromagnetic field comprising electric and magnetic lines of force. For example as shown in Fig. 11 such transmitting apparatus may comprise an antenna 5 and a ground connection 6 between which is connected a variable tuning inductance 7 provided with a movable contact 8 for adjusting the oscillatory circuit to any desired frequency. 9 is a tuning inductance by means of which high frequency alternating electric currents flowing therein may be induced in the elements 5, 6, 7, and 8 aforesaid, provided the frequency of the current in the tuning inductance 9 is adjusted by movable contacts 10, 11, and 12 to correspond to the frequency of oscillation of elements 5, 6, 7, and 8. A three electrode thermionic tube is indicated at 13 and is provided with the usual filament 14, plate 15, and grid 16. 17 is a grid-leak of suitable resistance depending upon the characteristics of the thermionic tube employed and 18 is a grid condenser of suitable capacity. A suitable source of electric current supply such as a storage battery 19 is connected to filament 14 for heating the same and the electrical characteristics of such current supply should conform with the requirements of the thermionic tube employed. A suitable source of direct current supply such as generator 20 is connected to the plate circuit of tube 13 and such generator is adapted to deliver direct current thereto at the voltage required by the characteristics of such tube. 21 is a protective condenser and 22 a stopping condenser to prevent short-circuiting the generator 20 through inductance 9. 23 is a high frequency choke to prevent oscillating currents from flowing through the generator 20.

The operation of the above-described transmitting device to produce high frequency alternating electromagnetic fields is so well known in the art of radio communication as to require no description here. It will be understood that, by adjustment of the contact members 10, 11, and 12, the frequency of the field set up by this device may be varied between wide limits, and this ability to produce fields of widely varying frequencies is essential for the purposes of my invention.

While I have described and shown one particular form of transmitting apparatus for generating high frequency electromagnetic fields it should be understood that any method of creating such fields of constant or interrupted, damped or undamped form such as a high frequency generator, "Poulsen arc," or an electron tube, or as a "power oscillator tube", or a spark or buzzer system, or any other method of generating damped or undamped electromagnetic fields, or in general any method of creating a high frequency electromagnetic field comprising both electric and magnetic lines of force may be used in place of the method illustrated.

For the purpose of determining the direction of the resultant electromagnetic fields in the area being explored and hence determining the location of underground conductors beneath such area, I prefer to employ a receiving apparatus comprising a coil or loop antenna mounted upon a tripod having means for levelling and orienting the same, and said coil being so mounted as to permit rotation thereof about a horizontal axis and a vertical axis so that the coil may be brought into any desired plane. Means are also provided for indicating both the horizontal and vertical angles of the plane of the coil at any time. Such apparatus may comprise as shown in Figs. 12, 13, and 14, a wire coil 1 of sufficient turns and dimensions to efficiently intercept, in combination with the variable condenser 26 for the purpose of tuning or bringing to resonance, a sufficient amount of energy from the electromagnetic field produced by the transmitting set or by the unknown conductor or the resultant of both such fields. The coil is mounted upon a horizontal axis 27 which is in turn mounted upon a suitable supporting device such as a semi-circular bracket 28 mounted to turn about a vertical axis 29 on a supporting tripod 30. Suitable scale means 31 and 32 may be provided for indicating the rotation of the coil about the horizontal axis 27 and the vertical axis 29. Suitable level devices 33 may be provided so that the axis 29 may be brought accurately to a vertical position and the axis 27 to a horizontal position, and a telescope 34 may be provided for orienting the device with respect to some known direction, such as North.

The two terminals 35 and 36 of coil 1 are connected respectively to the grid 37 and plate 38 of a thermionic tube detecting device 40 which is also provided with the usual filament 39. The connection between terminal 35 and grid 37 includes grid condenser and grid-leak 41 while the connection between the terminal 36 and plate 38 includes plate condenser 42. The terminal 43 which is located at approximately the middle of the winding of coil 1 is connected to one terminal of filament 39. Suitable means such as battery 44 may be provided for supplying electric current for heating the filament 39 and a rheostat 45 may be provided for regulating such current supply. A suitable source of direct current supply such as battery 46 may be connected to the plate circuit of tube 40, said battery being adapted to deliver current at a voltage corresponding to the characteristics of said tube. A suitable electric current indicating device such as a pair of telephone receivers indicated at 47 is also connected in series with battery 46. The circuit just described constitutes a so-called oscillating detector circuit well-known in the art of radio comunication and it will be understood that any suitable detecting circuit or means may be employed for detecting and measuring the current received by coil 1, in the place of that shown and described. The various parts of the circuit shown in Fig. 12 may conveniently be mounted in a suitable casing 48 which may be suspended on the tripod 30 as shown in Fig. 13.

When the coil 19 is placed in the region of an electromagnetic field in such manner that the magnetic lines of force of such field cut said coil a small electromotive force is induced, with a resultant current flow in the circuit composed of said coil and variable condenser 26 provided said condenser has been so adjusted that said circuit is in resonance with the said magnetic field. If now the oscillating circuit be adjusted by means of condenser 26 so as to be slightly out of resonance with the electromagnetic field then a sound will be heard in the telephone receivers 47, the pitch of which will depend upon the difference in frequency between the electric current induced in the oscillatory circuit by the electro-magnetic field and the electric current set up therein between thermionic tube oscillating and detecting element. The intensity of the sound thus produced in the telephone receivers will vary as the coil is rotated about its axis, and the position of the coil in which the intensity of such sound is at a maximum will be that in which the electromagnetic force therethrough is at a maximum. It is well known that this position is such that the plane of the coil is perpendicular to the direction of the lines of magnetic force of the field in which the coil is placed or if two such fields exist together, then the plane of the coil for maximum intensity of signal reception is perpendicular to the electromagnetic lines of force of the resultant of such fields.

It will be seen therefore that if the above described receiving apparatus is set up at a point in the region of an underground conductor and levelled and oriented in well-known manner, then if such coil be subjected to the combined effects of a primary field and a secondary field set up about said underground conductor, the "strike" and "dip" readings of the resultant of such fields, as above described, may be readily determined.

I may now outline the methods of locating the axis of an unknown underground conductor, utilizing the phenomena explained above to obtain the truest results. In actual practice I proceed as outlined in the following paragraphs:

Three surveys are preferably made of the area under search, as follows:

1. Preliminary survey.
2. Intermediate survey.
3. Final survey.

The preliminary survey is first made to determine the approximate location of any unknown conductors which may exist within the area under search.

An alternating electromagnetic field of known polarization, preferably vertically polarized, is applied to the area under search, for example by means of the apparatus shown in Fig. 11, and measurements of the field direction are made at different points in this area, by means of a direction finding coil such as shown for example in Figs. 12, 13, and 14. The frequency of the primary field is varied until indications are obtained which denote that a conductor is in the vicinity. Such indications include a distortion in the direction of the "strikes" from the true direction to the axis of the primary field, as shown in Fig. 5, and converging "dips" directly above the conductor, as shown in Fig. 6. The "strike" angle is obtained by rotating the direction finding coil about a vertical axis while maintaining the coil in a vertical plane.

In preliminary surveys the "dip" angle is obtained by placing the coil, while vertical, in the maximum "strike" position and then rotating the coil about its horizontal axis. An example of "dip" readings so obtained is shown in Fig. 15. Between the converging dips, as at 51, 52, a line 53 will be found upon which all dips, such as 54, will be vertical; this denotes the plan view of the axis of the unknown conductor. Upon this same line will also occur the greatest distortion in "strike" readings, as is evident from Fig. 5. The points 55, 56 in Fig. 15 indicate positions of "neutral vertical" for the frequency of primary field which was used.

An intermediate survey is next conducted over each indication in turn, to determine the optimum frequency, that is, the frequency which will give the truest indications of locations. The frequency of the primary field may be varied until the "neutral vertical" referred to above (see Fig. 6) is moved furthest out from the indications, such extreme position denoting the greatest intensity of secondary field about the unknown conductor. The "neutral vertical" for each frequency of primary field is determined by taking "dip" readings in the same manner as before, on both sides of the indicated plan view of the axis of the conductor and determining the point at which these "dips" become vertical. It will be found that the frequency which gives the greatest apparent distortion of the primary field toward the secondary field is that which also gives the sharpest minimums. The frequency of the primary field at which these conditions of maximum extent of influence of the secondary field and sharpest minimums exist, may in some cases be considered as being substantially the resonant frequency of the underground conductor or it may be the frequency at which the currents induced in the receiving coil by the primary and secondary fields are substantially in 0° phase relation, or it may be the frequency at which the combined effects of these two influences is a maximum, and a primary field of this frequency is employed in making the final survey. Other methods may be used for determining the optimum frequency of electromagnetic field. For example, the receiving coil may be set up at a single point on either side of the indicated position of the secondary conductor, the frequency varied, and the distortion of the coil from a vertical position noted for each frequency, until some frequency is found at which such distortion becomes a maximum and the "minimums" become the sharpest, and then, upon further variation of frequency in the same direction, the distortion again decreases and the "minimums" become broader, such frequency of maximum distortion and sharpest "minimums" then being the optimum frequency. In any event, in determining this frequency care must be taken that the distortion which is observed is from the vertical toward the direction to the axis of the conductor and not away from such direction. In case the "neutral vertical" method is employed, this condition is satisfied so long as the "dip" readings taken at points successively further out from the indicated position of the conductor converge or cross at increasing depths (that is, below the conductor as in Fig. 16), instead of at decreasing depths (that is, above the conductor as in Fig. 8) or above the surface as in Fig. 7. When the other method of maximum distortion is used, this condition is satisfied whenever the distortion from the vertical (the "dip") increases until a certain frequency is reached and then decreases again.

A final survey is now made of each region in turn, in which an indication of a secondary field has been obtained, for the purpose of obtaining accurate "dip" readings, from which the depth of the unknown conductors may be determined. Short traverses are surveyed at right angles to the indicated axis of the unknown conductor, extending to some arbitrary distance either side of the line of verticals above the axis, usually 50 to 200 feet, and these traverses are spaced at equal intervals along the line of vertical dips obtained above the axis, depending upon the total length thereof, a reasonable distance being 25 to 50 feet depending on the depth of the unknown conductor. Upon these traverses "dip" readings are made at equal or suitable distances either side of the vertical dip, the primary field being maintained at the optimum frequency determined as above described. These final "dip" readings are all obtained by placing the horizontal axis of the coil parallel to a horizontal plane projection of the indicated axis; in other words parallel to a horizontal line drawn through the verticals projected vertically through the axis of the conductor. The coil is placed in this position in order that the greatest effect of the secondary field may be impressed upon it. The coil is then rotated about its horizontal axis to obtain the "dip". These dips are then plotted in profile view. Fig. 16 illustrates an example of a profile view obtained on such a cross-section, due recognition being made of the contour of the surface upon which the dip readings are made at points 61 to 66. The point 53 is, as in Fig. 15, a point of a vertical dip directly above the axis. It will be seen that the dips do not intersect at a common point, but that dips taken equi-distant either side of the vertical do intersect each other upon the vertical projection 53, 59 of the vertical dip, due allowance being made for the element of personal error or deviation due to disturbing conditions in the surroundings etc. The dips which give the truest indication of the depth are those taken immediately adjacent to the vertical dip over the axis, as at 61 and 64, for it has been found that the angle of distortion is the least when the angle between a vertical line and the direction from the coil position to the axis is the least. The electrical axis of the unknown conductor will in general be slightly above the intersection of the two dips immediately adjacent to the vertical dip, and while the exact location may be determined by rather involved calculations depending upon the ratio of intensity of the primary and secondary fields, and upon their time-phase relationship at the point at which the dips are taken, such precision of measurements is not of sufficient value to the mining operations connected with exploiting the indication to justify the time and cost expended upon it.

A simple approximate method of determining the depth of the axis of the conductor by graphic extrapolation is illustrated in Fig. 17.

As abscissæ are plotted the horizontal distances of the points 61, etc., of Fig. 16, from point 53, while as ordinates are plotted, for each of such points, the depth at which the "dip" angle intersects the vertical 53, 59. Curves may then be drawn through the points 61', etc. thus obtained, and the point 68 at which these curves intersect the vertical 53, 59 indicates the approximate depth of the axis.

It will be evident from the above that my method leads to the obtaining of the most accurate results, particularly because of the fact that the frequency is first determined at which the secondary field exerts a maximum distorting effect, and the final measurements are made with a field of this frequency. At any point at which measurements are made, therefore, the indicated direction of the resultant electromagnetic field approaches as closely as possible that of the secondary field. In other words, the relative effect of the primary field is minimized by obtaining the strongest possible distorting effect due to the secondary field.

The advantages of this method are especially noticeable when two or more unknown conductors exist so close together that the receiving coil is influenced by the secondary fields surrounding both conductors as well as by the primary field. As this condition is often found in practice, the use of the above described method makes it possible to apply this method to the solution of problems which would be practically impossible to solve accurately by other methods.

In such cases, in accordance with my invention, the optimum frequency for each conductor is determined in turn by means of the methods above outlined, and this frequency is used in making the final survey of such conductor. Under these conditions the relative effect of the secondary field set up by that particular conductor is at a maximum, as compared not only with the primary field but also with other adjacent secondary fields, so that the maximum accuracy of results is obtained.

While I have described my invention particularly in connection with the location of conductive ore bodies, it will be understood that it may be applied to the location of any underground conductive bodies, such as pipe lines, cables, and the like.

What I claim is:

1. The method of locating a conductive body, which comprises setting up a primary electromagnetic field of known polarization in the region of such body so as to cause a secondary electromagnetic field to be established about the electrical axis of such body, determining the frequency of primary electromagnetic field at which the greatest apparent distortion of the primary field toward the direction of the secondary field is obtained, and then locating the unknown conductive body by means of electromagnetic methods comprising setting up a primary field of substantially the frequency so determined, and determining the apparent distortion of said primary field at a plurality of points, due to the resulting secondary field about said conductive body.

2. In the locating of conductive bodies by electromagnetic methods involving the creation of a primary electromagnetic field in the region of such a body and the determination of the apparent distortion in direction of such primary field due to the resulting secondary field about said body, the method of determining the optimum frequency of electromagnetic field for use in such methods, which comprises varying the frequency of the primary field and determining the frequency at which the apparent distortion of the primary electrmognetic field due to the secondary field surrounding such body is a maximum.

3. The method of locating conductive bodies, which comprises detecting the presence of such a body by noting re-radiation therefrom in a primary electromagnetic field, determining the frequency at which the secondary field about such conductor exerts the maximum distorting effect on the primary field and at which the sharpest indication of such distorting effect is obtained, and then accurately determining the position of such conductor by means of electromagnetic methods comprising setting up a field of substantially the frequency so determined, and determining the apparent distortion of said primary field, at a plurality of points, due to the resulting secondary field about said conductive body.

4. The method of locating conductive bodies, which comprises setting up a primary electromagnetic field of known polarization in the region of a conductive body so as to cause a secondary field to be set up about said body, obtaining a rough indication of the plan view location of such body by noting the apparent distortion of the primary field due to such secondary field, varying the frequency of the primary field and determining the frequency at which the apparent distortion of the primary field toward the secondary field is a maximum, and then employing a primary field of substantially the frequency so determined and measuring the apparent distortion of the primary field so as to obtain more exact indications as to the position of the conductive body.

5. The method of locating conductive bodies, which comprises detecting the presence of such a body by electromagnetic methods including the establishing of a primary electromagnetic field surrounding such body and noting the apparent distortion thereof by the secondary field around such body, then determining by electromagnetic methods the frequency at which the currents induced in a receiving coil by the primary and secondary fields are substantially in phase with one another, and then determining the location of the conductive body by locating the axis of such secondary field using electromagnetic methods comprising setting up a primary field whose frequency is equal to the frequency so determined, and determining the apparent distortion of said primary field, at a plurality of points, due to the resulting secondary field about said conductive body.

6. The method of locating conductive bodies which comprises setting up a primary electromagnetic field in the region of a conductive body, detecting the presence of such body by noting the apparent distortion of such primary field due to the secondary field surrounding such body, varying the frequency of the primary field and determining at which frequency the distorting effect of the secondary field may be detected over the greatest area, and then determining the location of the conductive body by electromagnetic methods comprising setting up a primary field of substantially the frequency so determined, and determining the apparent distortion of said primary field, at a plurality of points, due to the resulting secondary field about said conductive body.

7. The method of locating conductive bodies, which comprises setting up a primary high frequency electromagnetic field whose polarization is substantially vertical at the positions at which determinations are to be made, detecting the presence of a conductive body in such region by determining the direction of the total electromagnetic field at spaced points in such region and noting deviations of such direction from that of a simple vertically polarized field, varying the frequency of said primary field and noting at which frequency such deviations of direction caused by such conductive body extend over the greatest area of said region, and determining the location of said conductive body by determining the direction of the total field at points within such area of said region while the primary field is substantially of the frequency so noted.

8. The method of locating conductive bodies, which comprises setting up a primary high frequency electromagnetic field in the region of a conductive body and thereby causing a secondary electromagnetic field to be set up surrounding said body, varying the frequency of the primary field while determining the corresponding variation in strength of the secondary field, noting the frequency of primary field which causes a maximum strength of secondary field, and then maintaining the primary field at the frequency thus noted and determining the location of said body by determining the direction of the electromagnetic field at spaced points in said region.

9. The method of locating conductive bodies which comprises setting up a primary high frequency electromagnetic field in the region of such a body, detecting the presence of such body by means of the secondary electromagnetic field thus created about said body, varying the frequency of the primary field and determining the frequency at which the secondary field is a maximum, and then determining the location of said body by electromagnetic methods comprising setting up an electromagnetic field of substantially the frequency so determined, and determining the apparent distortion of the primary field, at a plurality of points, due to the resulting secondary field about said conductive body.

10. The method of determining the depth of underground conductors, which comprises establishing a primary high frequency electromagnetic field in the region of such a conductor so as to cause an induced alternating current to flow in such conductor and set up a secondary electromagnetic field surrounding said conductor; determining the horizontal projection of the axis of said conductor by means of the resultant effects of said primary and secondary fields upon a receiving coil at spaced points on the earth's surface; determining, at a plurality of points on the earth's surface and at different distances from said horizontal projection along a traverse parallel to said horizontal projection, the vertical angular direction of the plane in which a coil receiver, when rotated about an axis substantially parallel to said horizontal projection at each of such points, receives the maximum intensity of current, while maintaining the magnetic lines of force of the primary field substantially horizontal at such points; determining the depths at which such directions intersect the vertical passed through said horizontal projection; and then, by noting the variation of the depths of intersection of such directions with said vertical in accordance with the variation in the distance of the points of measurements from the horizontal projection, determining the approximate depth of said conductor.

11. The method of determining the depth of an underground conductive body whose approximate plan view location is already known which comprises establishing a primary high frequency electromagnetic field in the region of said conductive body so as to cause alternating current to flow in said body and produce a secondary electromagnetic field surrounding said body; determining, at a plurality of points on the earth's surface and at different distances from said plan view location along a traverse perpendicular to said plan view location, the vertical angular direction of the plane in which a receiving coil, when rotated about an axis substantially parallel to said plan view location at each of such points, receives the maximum intensity of current, while maintaining the magnetic lines of force of the primary field substantially horizontal at such points; determining the depths at which such directions intersect the vertical passed through said plan view location; plotting a curve showing the relation between the distance of the points of measurement from the plan view location and the depth of intersection of said directions with said vertical; and then determining the depth at which such curve intersects said vertical.

In witness that I claim the foregoing I have hereunto subscribed my name this 13th day of July, 1926.

EDW. H. GUILFORD.